United States Patent [19]

Pole

[11] Patent Number: 4,502,590
[45] Date of Patent: Mar. 5, 1985

[54] CONVEYOR APPARATUS

[76] Inventor: Charles D. Pole, 16 Revco Dr., Willowdale, Ontario, Canada, M2M 2B8

[21] Appl. No.: 614,116

[22] Filed: May 25, 1984

Related U.S. Application Data

[63] Continuation of Ser. No. 355,351, Mar. 8, 1982, abandoned.

[30] Foreign Application Priority Data

Apr. 28, 1981 [CA] Canada .................................. 376447

[51] Int. Cl.³ ............................................ B65G 47/58
[52] U.S. Cl. .................................... 198/611; 198/803; 414/144
[58] Field of Search ............... 198/601, 611, 642, 803; 414/140, 144, 786

[56] References Cited

FOREIGN PATENT DOCUMENTS

1106684 11/1961 Fed. Rep. of Germany .

Primary Examiner—Robert J. Spar
Assistant Examiner—Janice Krizek
Attorney, Agent, or Firm—Alan Swabey; Robert Mitchell; Guy Houle

[57] ABSTRACT

Conveyor apparatus in which there is a first conveyor for transporting material in one direction and a second conveyor for transporting material in a different direction. Between the respective conveyors there is a rotatable deflector dish having a concave surface in a position to intercept material discharged from the first conveyor and to deliver it to the second conveyor. The deflector dish is mounted so that it is rotated, at least partially, by the momentum of the material received from the first conveyor.

11 Claims, 13 Drawing Figures

CONVEYOR APPARATUS

This is a continuation of application Ser. No. 355,351 filed Mar. 8, 1982, now abandoned.

BACKGROUND OF THE INVENTION

1. Field of the Invention

This invention deals with transferring solid materials from one conveyor to another travelling in a different direction.

2. Description of the Prior Art

Conveyor belts are widely used to move large tonnages of material. When a sudden change in horizontal direction is required it is usually necessary for the material to be transferred to another belt travelling in the new direction.

Conveyor belts used for transferring large quantities of bulk material vary in width between 12 inches and 108 inches with 36 inches to 84 inches being common. They usually travel at 150 feet per minute to 1200 feet per minute with 200 feet per minute to 800 feet per minute being a common range. Such belts generally handle between 200 tons per hour to 20,000 tons per hour with 1,000 to 10,000 being common.

It is normal to have the end of the first belt raised several feet above the receiving belt and to employ a vertical box-like structure, at this location, (usually referred to as the "transfer point") to guide the material from the first to the second belt. The prior art has, in some cases, utilized fixed deflector plates, within this structure, to assist in changing direction of the material and also to contain the flow within the physical dimensions of the receiving belt, to reduce spillage.

The flow on the first belt or feeder belt is not always even and there are sometimes large surges in flow which can cause a boiling effect with the structure at the transfer point. A large surge can cause the "transfer" to block with material and cause spillage and also damage the conveyor belt.

Several other problems also exist with these transfer points, as they now exist. Two separate changes in direction take place, each of approximately 90°. First, when the material, in its trajectory from the end of the first belt, is guided vertically downwards, and second, when the material contacts the second belt and is accelerated in a different direction. This second change in direction causes accelerated belt wear and uses additional energy.

Fixed deflector plates, within the box-like transfer structure, are also subject to excessive wear from friction created between the moving material and the fixed material of the deflector plates. Foreign objects such as tramp iron or frozen lumps of material, are frequently unable to make the turns and lodge within the transfer structure and block the flow and/or damage the receiving belt. This may cause plugging of the transfer structure, which may require a shut-down of the system to permit removal or dislodgement of the surplus or foreign material. Degradation of the material being handled may also occur due to the impact between the lumps during the two 90° turns. An example of this is the degradation of iron ore pellets by striking against each other causing particles to break off and sometimes even causing the pellets to break down into powder, reducing the value of the material delivered.

In an effort to eliminate some of these problems, abrasive resistant steels or alloys have been introduced into the structure of the transfer devices to better withstand the constant impact. Greater horsepower has also been provided on the drive of the receiving belts to cater to the re-acceleration of the bulk material. It has been found desirable in some cases to increase the horsepower of short receiving belt drives by as much at 50% to accommodate overloads caused by surges.

Specially designed impact rollers are often positioned below the section of belt below the transfer box to cushion the vertical fall of the material and thus increase belt life. Impact rollers are usually of steel construction, with rubber tires mounted on them over the entire length.

SUMMARY OF THE INVENTION

The prior art transfer devices suffer from disadvantages that it is the aim of the present invention to overcome and provide certain positive advantages as will be apparent from the following description.

The present invention is applied to conveyor apparatus which includes first or delivery conveyor means for transporting material in one resultantly horizontal or receiving direction and second conveyor means for transporting it in a different direction. Most often, the first conveyor means will include a conveyor belt moving in one direction and the second conveyor means a conveyor belt moving in a different direction. The conveyor belts may be horizontal or sloping. Between respective conveyor means there is transfer means, according to the invention, including a continuous mobile surface in a position to intercept material discharged from the first conveyor means and to deliver it to the second conveyor means. The surface is adapted to be moved, at least partially, by momentum of the material received from the first conveyor means.

The transfer means includes a generally circular recessed dish member provided with a symmetrical continuous smooth unobstructed working surface flaring outward from a central axis extending through planes perpendicular thereto to a circumferential rim. There is means mounting the dish member for rotation about said axis whereby its working surface is spaced from and generally faces said discharge end of said delivery conveyor means with its lowermost part sloping downward from the horizontal whereby it moves through an upper zone positioned to catch the freely falling material from the delivery conveyor means and to absorb its momentum and through successive zones to guide the material through a downward path changing in resultantly horizontal direction and to cause it to slide off the surface at the rim, to fall freely in a downward trajectory in the conveying direction of the receiving conveyor means. The receiving conveyor means has a receiving end positioned to catch the freely falling material from the working surface of the dish member.

Preferred characteristics of the dish member and its setting are as follows. The recessed surface has an angle between about 1° and about 60° to a plane perpendicular to its axis. The axis may be set at an angle within the range from parallel to the line of direction of the first belt and 40° to that line of direction. The center of the dish member is offset from the center of the first belt not less than half a belt width. The center of the dish member should be set at approximately the same level as the surface of the feed belt at an angle of from 0° to 10° from the horizontal. The elevation should be such that the lower rim of the dish member is above the surface of the receiving belt and the diameter of the dish member is at least twice the width of the feed belt. Means may be provided for cleaning the surface of the dish member, the cleaning means taking, for example, the form of a rotating brush. There may be several dish members arranged to receive part of the material from the first conveyor means and deposit it on the second conveyor means.

A special application is to transfer apparatus from parallel belts to a third belt running between them. This is specially useful in the hold of a ship where the parallel belts are tunnel belts or the intermediate belt is a loop conveyor belt which, in turn, leads to a boom belt to convey the material up from the hold.

The deflector, that is the dished unit, may vary considerably in respect of its size and shape and its rotatable mounting as will be described in detail.

The invention also contemplates a method in which material is conveyed and discharged in a first direction and intercepted and then conveyed in a second direction, in which the material is intercepted by a movable surface which derives at least part of its impulsion from the momentum of the material itself.

BRIEF DESCRIPTION OF THE DRAWINGS

The invention will now be described in more detail by reference to the accompanying drawings, showing preferred embodiments, and in which.

DESCRIPTION OF THE PREFERRED EMBODIMENTS

General Arrangement and Operation

Figure 1:
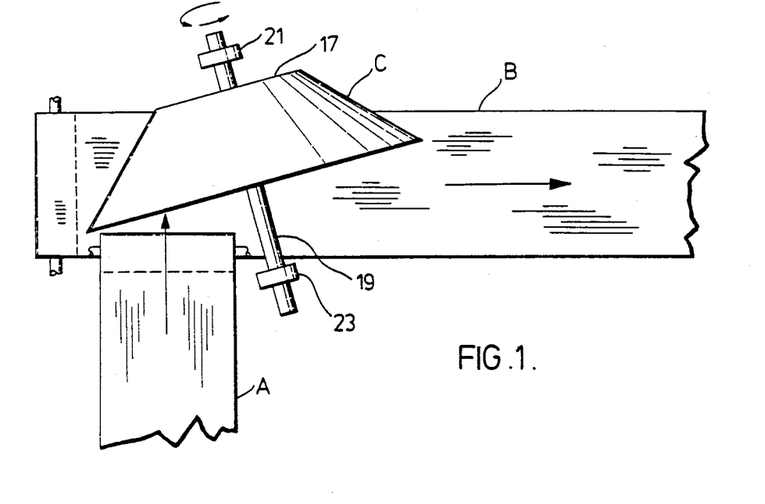
FIG. 1 is a top plan view of a typical transfer apparatus, according to the invention, with conveyor belts running at right angles to one another.
Figure 2:
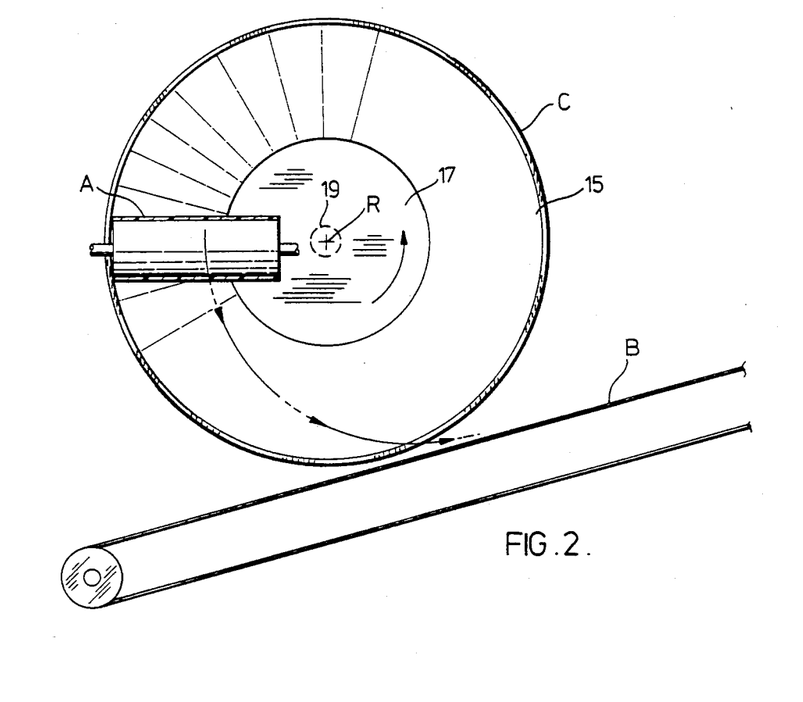
FIG. 2 is a fragmentary view of the apparatus of FIG. 1 on a larger scale looking towards the working face of the deflector.

Referring to FIGS. 1 and 2, there is illustrated a fundamental conveyor apparatus equipped according to the invention.

A feed conveyor belt A is adapted to convey the material from a given source in a feed path in the direction of the arrow. A belt B is located below the delivery end of the belt A to run in a different or output path.

In accordance with the invention, means for transferring the material from the delivery end of the belt A to the receiving end of the belt B is provided, which includes a deflector C. The deflector C is a dish member made up of a dished or frusto conical wall 15 and a circular base 17. The deflector C is mounted at a hub on its base 17 on a shaft 19 by suitable connecting means so that the deflector is rotatable. The shaft 19 is journalled in bearings 21 and 23 suitably mounted on a stable stationary structure (not shown).

In operation, material, for example, coarse sand, is conveyed by the belt A from a source of supply and delivered from its delivery end to the dished surface of the wall 15. The forward and gravitational movement of the material, spilled from the delivery end of the belt A, imparts energy to the cone C causing it to rotate. The material passes partly about the rotating surface of the cone C and spills from it onto the conveyor belt B with a forward and downward trajectory in the direction of travel of belt B.

The direction of the material, therefore, changes from the feed direction of the belt A to the output direction of the belt B, while maintaining energy imparted by momentum generated in it by the movement of the belt A and by gravity through the fall of the material from the level of the belt A to the level of the belt B. The contact of the material with the cone C thus imparts impelling spin to the latter which it translates, in the material, into linear force in the direction of the belt B.

There are a number of criteria and variables involved in adjusting the deflector for the transfer of the material from the belt A to the belt B, as will be discussed later.

Generally speaking, the deflector C is a dish which is free to rotate about its axis and with its concave side towards the first belt A, placed with its axis roughly in line with the belt A, or, at an angle in the horizontal plane, to the line of the belt A, say 0° to 30°, that it will receive the material on the inside surface of its wall 15 and deflect the material to move in the direction of the belt B and discharge it on the belt B moving in that direction.

The deflector should be positioned to allow the material which is falling in its trajectory from the end pulley of the belt A to strike the surface of the dish C at an angle before being carried around on the working surface of the deflector towards the intended discharge direction and finally discharged from the dish C at about its lowest part or the part between the lowest point of the rim and another point about 50° from a vertical line down from the axis and following the direction of rotation. The material contacts the deflector C at one side of its axis and about the same height as its axis and at the side travelling downwards as the deflector rotates counterclockwise in FIGS. 1 and 2.

The material, while essentially describing an arc or spiral round the axis, under the action of gravity and centrifugal force, moves to the outside rim of the flared wall 15 and leaves the deflector C at a lower zone close to the belt B with the material travelling substantially in the desired direction of travel of the belt B.

Deflector-Positioning

Figure 7:
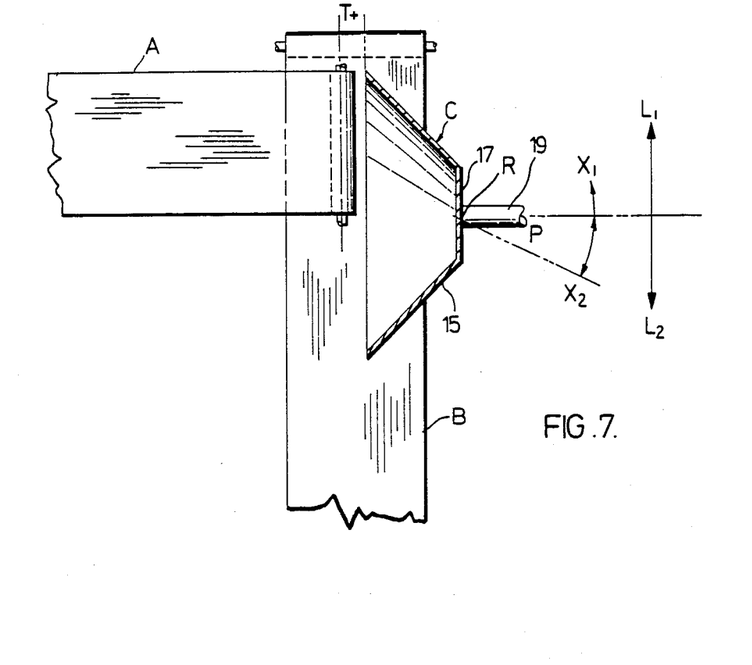
FIGS. 7, 8 and 9 are schematic views in plan, side elevation and front elevation respectively illustrating various adjustments that may be made in the position and attitude of the deflector.
Figure 8:
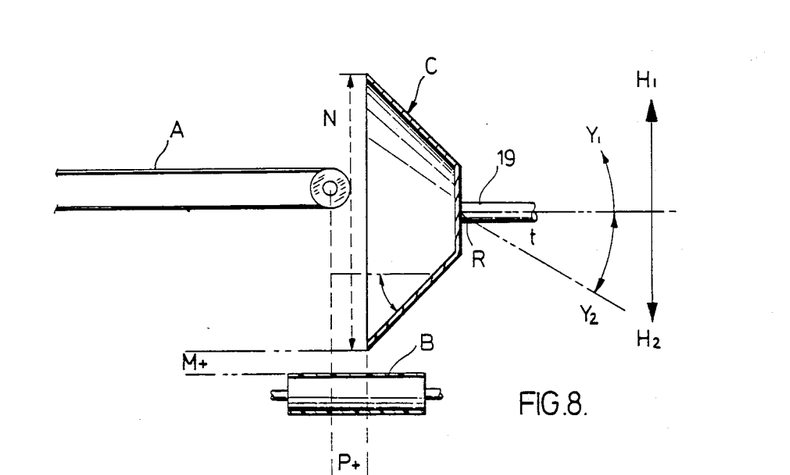
Figure 9:
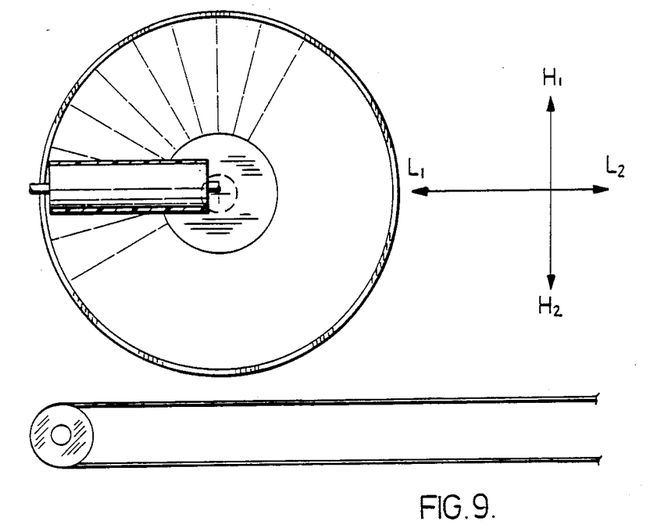

FIGS. 7, 8 and 9 illustrate possible variations in the setting of a deflector C relative to a feed belt A and receiving belt B, with the belts shown at right angles to each other for the sake of simplicity.

Referring to FIGS. 7 through 9, $X_1-X_2$ represents the arc of rotation of the deflector C in the horizontal plane about the hub H of the cone C, i.e. where the shaft 19 joins the base 17, through an angle p.

Line $L_1-L_2$ represents variations of the position of the hub of the deflector C laterally relative to the feed belt A.

The line T+ represents the setback of the rim of the deflector from the central axis of the front pulley of the belt A.

The line $H_1$–$H_2$ represents variations in the vertical height of the deflector axis (at its hub) relative to the axis of the front pulley of the conveyor A.

The arc $Y_1$–$Y_2$ represents the arc of rotation of the deflector about the vertical axis of its hub through the angle t.

M+ represents the vertical distance from the rim of the deflector to the surface of the receiving belt B.

N represents the diameter of the deflector.

P+ represents the distance from the centerline of the pulley of the delivery belt A to the rim of the deflector C.

Various factors have a bearing on the setting of the deflector C and consequently of the values of the dimensions mentioned, of which examples will be cited.

The outside rim of the deflector should be roughly in line with the receiving belt and at a small angle p to the receiving belt, of between 0° and 30°, with 15° being preferable, but not at the center of the belt.

The deflector C must be positioned back from the center a certain distance (T+) to allow the flowing material to be centrally located on the belt B.

The deflector C should be so positioned vertically that the lower rim is clear of the receiving belt (distance M+) by several inches, say between 1 inch and 12 inches. The preferred distance M+ will vary, depending on the size of the deflector C, the nature of material being handled, and the belt speed.

A preferred position of the deflector C, if sticky substances have to be transferred, is for its axis to be inclined to the horizontal (angle t) by between 0° and 10°, with about 5° being preferable. This inclination to the horizontal steepens the angle of the side of the deflector at the lowest point of the rotation where the discharge is taking place and allows the material to flow more easily onto the receiving belt B.

With the receiving belt at about 90° to the first belt, a preferred position of the deflector in a horizontal position is to have the axis of the dished working surface offset to the line of the first belt by an angle p of about 5° to 40°, with about 15° preferred.

Deflector-Characteristics

The size of the deflector will vary in accordance with the size of the belts being used in the system. Generally, when used for transporting substantial quantities of bulk material, the belts have a width in the region of 18 inches to 108 inches, with 36 inches to 84 inches common. The diameter N of the deflector should not be less than double the width of the belt, preferably not less than 10% greater than double. This would mean that with a first or feeder belt A of 72 inches in width, the deflector C should have a diameter N not less than 12 feet and preferably not less than 13 feet 3 inches. The wall 15 of the deflector should be between 30° and 80° (angle t) to the axis, with 45° to 55° being preferable.

The material used in the construction of the inner surface of the cone depends on the bulk material being handled on the conveyor belts. For example, crushed stone, iron ore, coal, gypsum, sand, etc., calls for a steel or similar abrasive-resistant material. If grain or other less abrasive material is being handled, forms of plastic or other low friction material could be used.

Deflector-Mounting-Drive

The deflector is preferably self-powered, i.e. to permit the normal flow of material to cause the desired speed of rotation. When properly journalled, in good bearings, and with the working surface having a suitable coefficient of friction, the speed of rotation of the deflector C will be close to the speed of the material received. This will reduce frictional wear.

The working surface of the deflector must, on the one hand, have a coefficient of friction high enough for the material fed to it to cause its rotation. On the other hand, the coefficient of friction must not be high enough to interfere with the sliding of the material from the deflector surface, degradation of the product, and also degradation of the deflector itself. The applicant prefers the surface having a coefficient to friction ranging from about 0.1 to about 0.7.

In some cases, it may be desirable to provide means of rotating the deflector, specially prior to start up, to give the material delivered the desired trajectory from the beginning of its transfer operation. Likewise, if a greater horizontal component of discharge trajectory is desirable, this may be attained by increasing the rotation of the deflector above the "natural" speed by supplemental power through electrical or other power means.

The rotatable mounting of the deflector C may be varied to suit the circumstances. The following are examples of suitable mountings.

Figure 3:
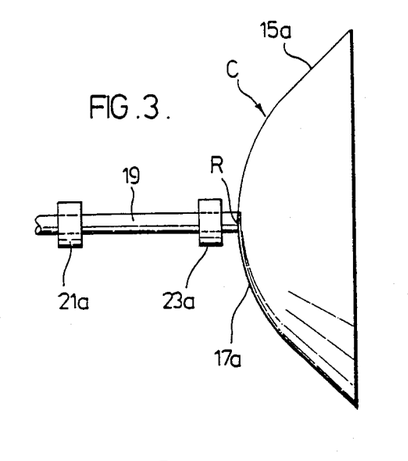
FIGS. 3 to 6 are schematic illustrations of various arrangements of shaft mountings, also illustrating various deflector shapes.
Figure 6:
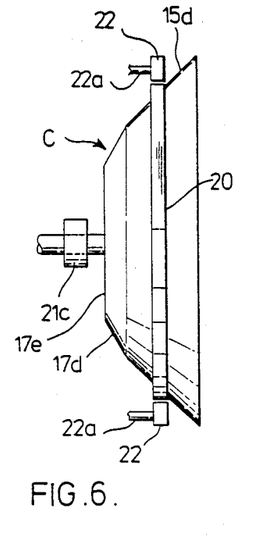

As shown in FIG. 3, the deflector C may be fitted with and be supported by a bearing shaft 19 protruding outward and away from its hub R apex and in line with its axis. Two or more bearings on this shaft may be used. As shown in FIG. 6, a bearing collar or track 20 around the sloped side, but in a plane parallel to the rim of the deflector C, may be fitted and only one shaft bearing 21c may be necessary. Wheels 22 mounted on shaft 22a journalled from a fixed structure are provided to bear against the collar or track 20.

Figure 4:
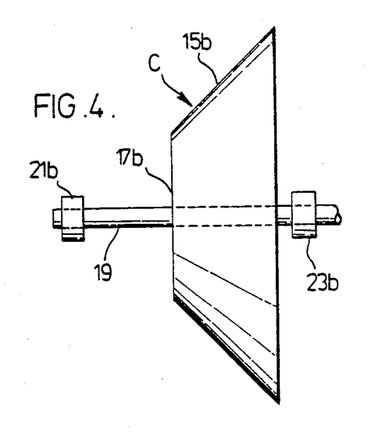

Alternatively, as shown in FIG. 4, the deflector C may be mounted and supported by a shaft 19 in line with its axis and which protrudes out from both ends. Such mountings would require a bearing 21b at one end and a bearing 23b at the other end.

Figure 5:
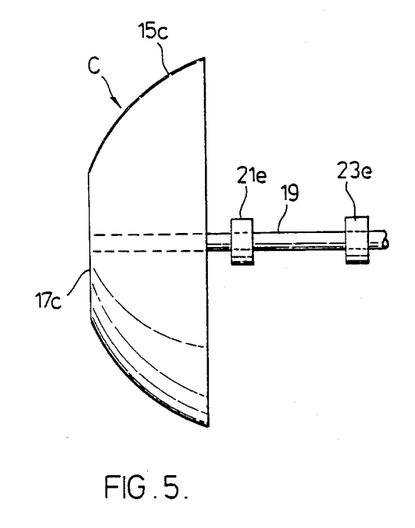

In another arrangement, the deflector C is mounted and supported by two or more bearings 21e, 23e on a shaft 19 in line with the axis and protruding only on the side away from the hub as in FIG. 5. This configuration is advantageous if there are space constraints at the reverse side of the deflector C, for example, on shipboard.

Deflector-Alternative Constructions

Various deflector shapes are also possible. In a preferred design, the normal apex or point of a frusto-conical deflector 15a is replaced with a frusto-spherical part 17a, see FIG. 3. The sides of such part sphere is tangential to and welded or fixed to the sides of the remaining part of the deflector. Such a combined design of cone and sphere eliminates the probability of material collecting at the center where centrifugal forces are minimal and also allows overloads to be more efficiently handled.

Another design of revolving receptacle is part of a sphere (less than half) mounted in a similar manner as described previously. A number of combinations of straight sides or curved surfaces may be used to provide the saucer or bowl effect required to turn the material in essentially one curved path towards the direction required. Examples are shown in FIGS. 3 to 6.

Figure 11:
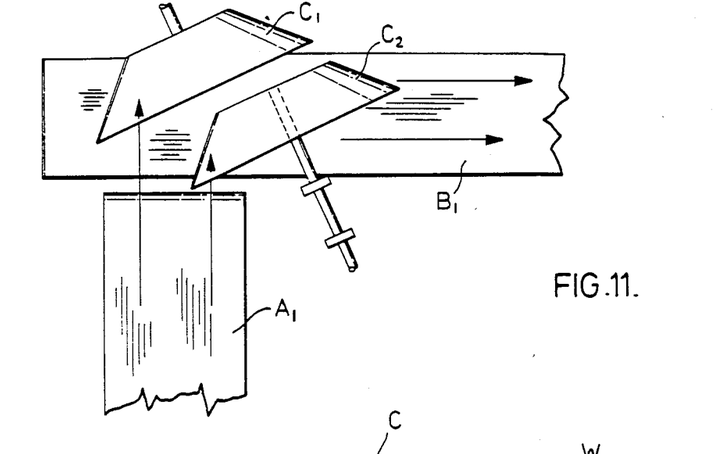
FIG. 11 is a top plan view illustrating the use of a pair of deflectors in parallel.

FIG. 11 is a diagrammatic illustration employing more than one deflector.

Referring more particularly to FIG. 11, a feed belt $A_1$ is disposed perpendicularly to a receiving belt $B_1$. Deflectors $C_1$ and $C_2$, in parallel, deflect material passing from the feed belt $A_1$ onto the receiving belt $B_1$.

Belts

The applicant contemplates belts ranging in width between 12 inches and about 108 inches with 36 to 84 inches preferred. These belts will usually travel at 150 feet per minute to 1200 feet per minute, with 200 to 800 feet per minute being a preferred range. Generally, such belts handle between about 200 tons per hour to 20,000 tons per hour, with 1,000 to 10,000 being common.

Cleaning

Figure 12:
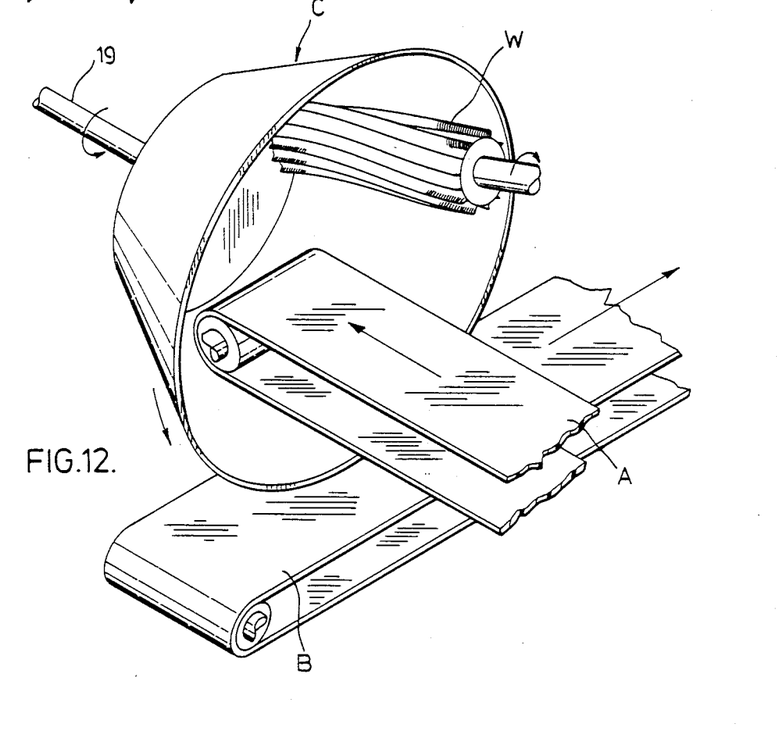
FIG. 12 is a perspective view of another form of deflector according to the invention, in this case equipped with cleaning means.

FIG. 12 illustrates another arrangement in which the deflector is provided with means for removing material from the working surface. In this case, a brush-type conveyor belt cleaner W is shown. The reference numerals given to the other parts are similar to those in previous figures except that the 100's unit has been raised.

Adjustment of Deflector

It will be evident from the above, that there are a number of factors into the positioning and setting of the attitude of the deflector. These factors include, among others, the angles of the belts to one another in the horizontal plane, the inclination of the respective belts, the size of the belts, belt speeds, materials being handled, and so on. It is evident, therefore, that to achieve preferred results in any given set of circumstances, it may be necessary to work by trial and error to find the ideal setting. To this end, the deflector may be adjustably mounted so that it can be moved to various positions and attitudes as suggested above.

Once an ideal position and attitude has been ascertained, by trial and error, for any given set of circumstances, then for subsequent installations, the deflector may be mounted in a fixed position and fixed attitude with respect to the belts. The invention, therefore, contemplates a procedure in which the deflector is mounted to permit it to be moved vertically and horizontally and for its attitude to be altered by rotating it about its hub both in the horizontal and vertical plane and data accumulated on its performance in the various positions. The resulting data can then be employed to install a deflector having an ideal fixed position and fixed attitude.

Shipboard Application

Figure 13:
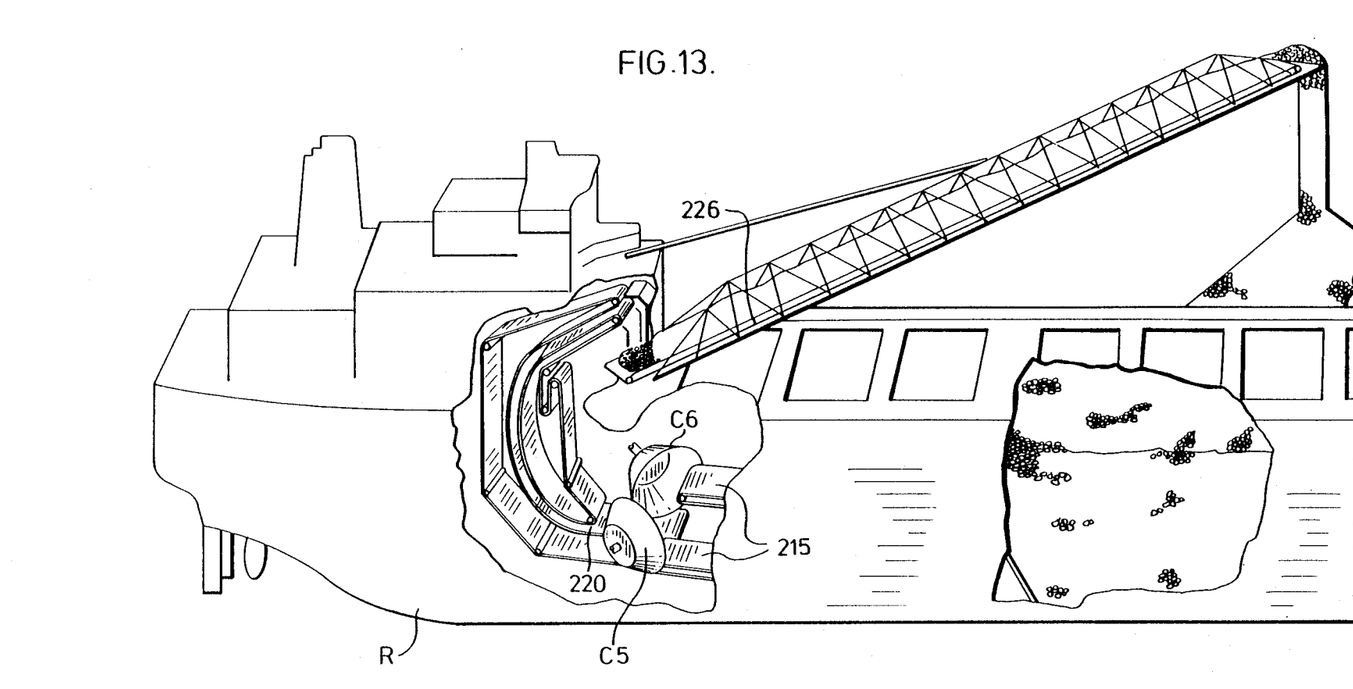
FIG. 13 is a diagrammatic perspective view showing shipboard installation.

FIG. 13 illustrates another application of the invention to conveyors of the type disclosed in the U.L.S. Upper-Lakes Shipping Ltd. literature on self-unloading ships and the illustration entitled "Hopper Type Self-Unloading Bulk Carrier".

The hull of the ship is illustrated as R. Operating from the hold of the ship are two tunnel belts 215. The tunnel belts 215 discharge respectively onto deflectors $C_5$ and $C_6$ which, in turn, deliver the material to a loop belt conveyor 220 which, in turn, discharges the material onto a boom belt conveyor 226.

The overall arrangement is well known except for the use of the deflectors in place of a pair of transversely extending conveyors which would normally deliver the material from the tunnel belt conveyors 215 to the loop belt conveyor 220. Considerable saving in power and space is achieved by this arrangement.

Detailed Construction of Deflector

Figure 10:
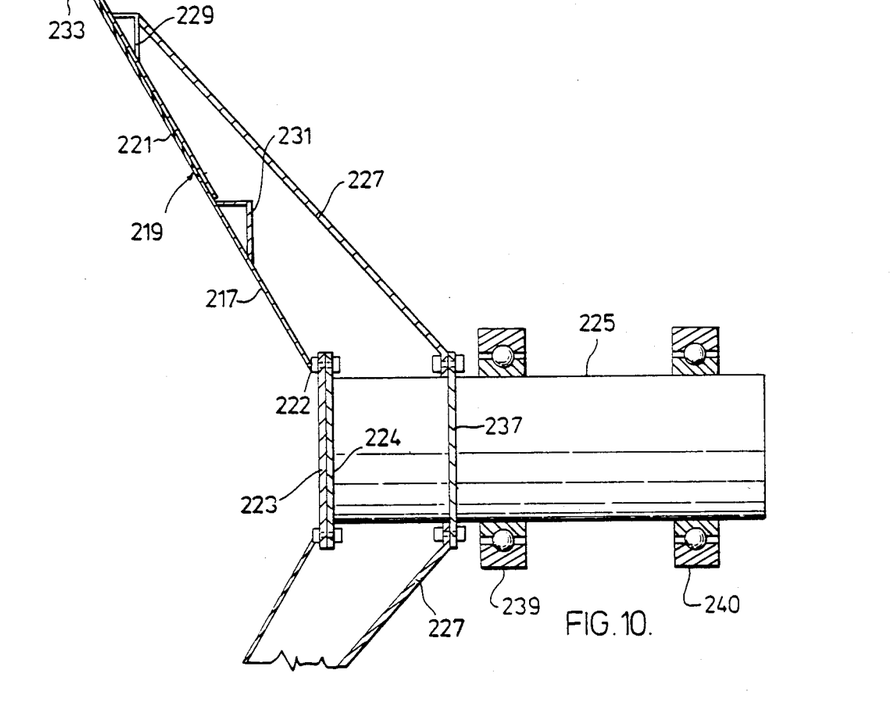
FIG. 10 is a fragmentary side elevation partly in section showing one construction of deflector according to the invention.

Reference will now be made to FIG. 10 illustrating a preferred deflector construction.

The working wall of the deflector is made up of a frusto conical steel plate 217 and an extension in the form of another frusto conical steel plate 219 faced with a ceramic surface 221. The plate 217 is welded as at 222 to a base plate 223 bolted to a ring 224 which, in turn, is connected to the shaft 225. Radial T-stiffeners 227 are provided at intervals about the rear face of the working wall. Rolled angles 229 and 231 extend in the circumferential direction about the reverse face of the working wall 217, 219. A ring 233 is welded to the outer edge of the working wall 217, 219 to provide a rim. The stiffeners 227 are connected to a ring 237 extending about the shaft 225. The shaft 225 is carried by bearings 239 and 240 which are suitably housed and supported from a strong stable supporting structure (not shown).

Advantages

From the foregoing, it will be evident that the invention has certain advantages over prior ways of handling material, including the following:

1. The material can be transferred from conveying means moving in one direction to conveying means moving in another without damage to the material and without dissipating energy generated through the conveying.
2. Where transfer is to a receiving belt, friction between the material and the latter is reduced with the commensurate reduction of wear.
3. The transfer arrangement is not prone to blocking and consequent shut-down of the system.
4. Other advantages will be apparent from comparing the present development with earlier material handling expedients.

I claim:

1. A method, in which material is conveyed and discharged in a first resultantly horizontal direction, intercepted, and then conveyed in a second resultantly horizontal direction which is transverse with reference to said first resultantly horizontal direction, comprising,
   discharging the material being conveyed in said first direction for free fall in a downward trajectory, having a horizontal component,
   directly intercepting all the freely falling material by placing a rotatable bowl-like concave unobstructed working surface in its direct path to derive at least part of its motion from the momentum of the material, and conducting the material on said unobstructed concave working surface through a downward path changing in resultantly horizontal direction and freely passing it from said surface to fall freely in a downward trajectory in said transverse resultantly horizontal direction,
   catching the free falling material and conveying it in said transverse resultantly horizontal direction.

2. A method according to claim 1 wherein the freely falling material is intercepted by the concave working surface below a center of rotation of said concave working surface to restrict horizontal movement of intercepted material on the concave member to the resultantly horizontal direction.

3. A conveyor apparatus, comprising, delivery conveyor means for transporting material in one resultantly horizontal direction and discharging it from a discharge end of said delivery conveyor means to fall freely in a downward trajectory, said delivery conveyor means being operable to provide the trajectory of the material with a substantial horizontal component, receiving conveyor means disposed transversely relative to and below said delivery conveyor means to catch the falling material, and to transport it in a different resultantly horizontal direction to that of said delivery conveyor means, between said delivery and receiving conveyor means, transfer means, said transfer means including a single generally circular recessed dish member provided with a symmetrical continuous smooth unobstructed bowl-like concave recessed working surface flaring outward from a central axis extending through planes perpendicular thereto to an unobstructed circumferential rim, means mounting said dish member for rotation about said axis and positioning said dish member whereby its recessed working surface is spaced from and in the direct path in a vertical plane of the said trajectory of the free falling material from said discharge end of said delivery conveyor means with its lowermost part sloping downward from the horizontal whereby it moves through an upper zone positioned to intercept all the freely falling material from the delivery conveyor means and to absorb its momentum and through successive zones to guide the intercepted material through a downward unobstructed path changing in resultantly horizontal direction and to cause the intercepted material to slide freely off of said recessed surface at said rim to fall freely in a downward trajectory in the conveying direction of said receiving conveyor means, said receiving conveyor means having a receiving end positioned to catch the free falling material from said working surface.

4. A conveyor apparatus, as defined in claim 2, in which the axis of the working surface is set in the vertical plane from horizontal to inclined to horizontal by 30 degrees and in the horizontal plane at an angle of between 0 degrees and 30 degrees to the direction of movement of the receiving belt.

5. A conveyor apparatus, as defined in claim 2, in which said delivery conveyor means includes a belt, said recessed surface is that of a dish member having an angle between 1 degree and 60 degrees to a plane perpendicular to its axis and in which the axis of said dish member is set at an angle within the range from being parallel to the line of direction of said belt to being at an angle of 40 degrees to said line of direction, and the center of said dish member is offset from the center of said belt not less than half a belt width.

6. An apparatus, as defined in claim 4, in which the axis of the dish member is set at approximately the same level as the surface of the feed belt at an angle from 0 degree to 10 degrees from the horizontal, with the elevation of the dish being such that its lower rim is above the surface of the receiving belt and the diameter of the dish is at least twice the width of the feed belt.

7. A conveyor apparatus, as defined in claim 3, in which said working surface has a coefficient of friction ranging from about 0.1 to about 0.7.

8. A conveyor apparatus, as defined in claim 3, in which said working surface has an inner part made of a first material and an outer part made of a second and different material of greater wear resistance than that of said first material.

9. A conveyor apparatus according to claim 3 wherein said axis is at least at the maximum elevation of falling material delivered by said delivery conveyor means.

10. A conveyor apparatus according to claim 3 wherein said receiving conveyor means fully underlies said rim.

11. A conveyor apparatus according to claim 3 wherein said dish member opens downwardly towards said receiving conveyor means.

* * * * *